H. REICHEL.
CUTTING OR SLITTING MACHINE.
APPLICATION FILED JUNE 23, 1913.
1,190,192.
Patented July 4, 1916.
2 SHEETS—SHEET 1.
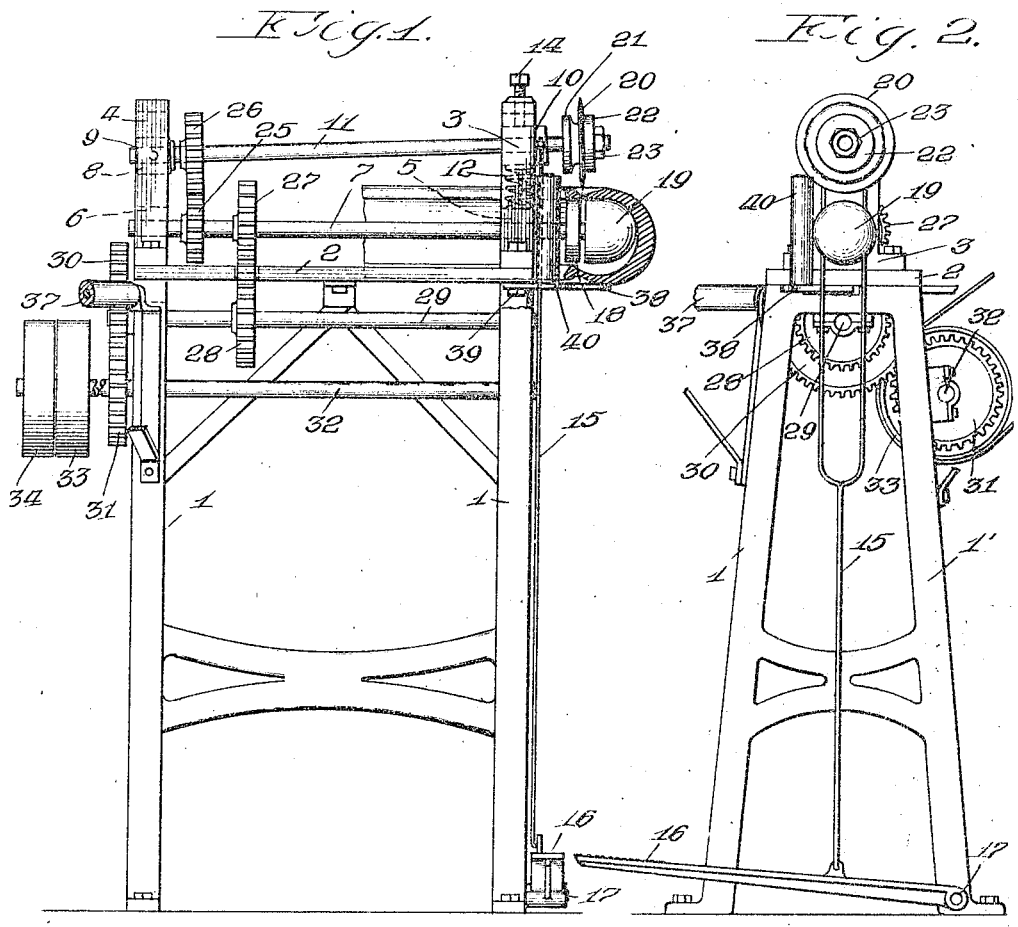
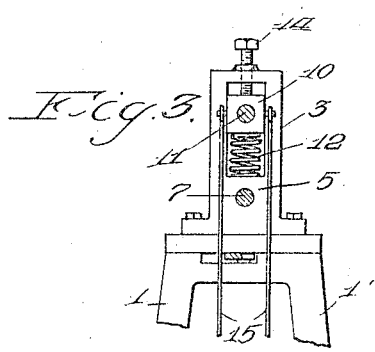
Witnesses:
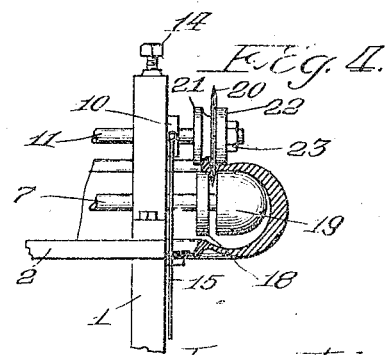
Inventor
Hugo Reichel
By Burton U. Hills
Atty

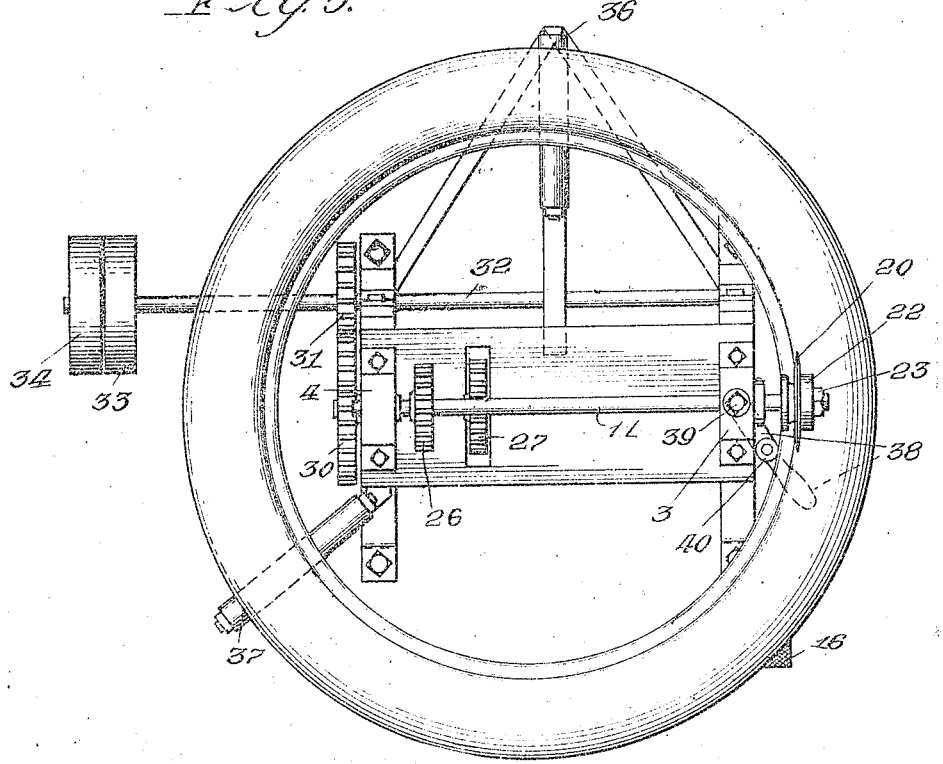

UNITED STATES PATENT OFFICE.

HUGO REICHEL, OF CHICAGO, ILLINOIS.

CUTTING OR SLITTING MACHINE.

1,190,192.

Specification of Letters Patent.   Patented July 4, 1916.

Application filed June 23, 1913.   Serial No. 775,326.

*To all whom it may concern:*

Be it known that I, HUGO REICHEL, a citizen of the United States, residing at Chicago, in the county of Cook and State of Illinois, have invented certain new and useful Improvements in Cutting or Slitting Machines, of which the following is a description.

My invention relates to cutting mechanisms suitable for cutting belts or other heavy fabrics, such as automobile tires and the like.

The object of my invention is to provide a strong, simple, durable and convenient device of the kind described which may be employed upon almost any material and is especially serviceable for removing the clenchers from automobile tires.

To this end my invention consists in the novel construction, arrangement and combination of parts herein shown and described and more particularly pointed out in the claims.

In the accompanying drawings wherein like or similar reference characters indicate like or corresponding parts: Figure 1 is a side elevation of my device. Fig. 2 is an end elevation of the same. Fig. 3 is a fragmentary detail of the movable bearing of my device. Fig. 4 is a similar view showing the cutter in operative position. Fig. 5 is a plan view of my device with an automobile tire in position to be cut.

In the form shown my device consists of suitable supporting legs or brackets 1—1 with a table or frame 2 rigidly mounted thereon and a pair of yokes or guides 3—4 mounted at opposite ends of the frame 2 respectively. As shown the yokes 3 and 4 are substantially similar and comprise a pair of upright parallel guides connected at their top and suitably spaced from each other to receive a pair of bearings in each yoke. The bearings 5 and 6 are rigidly secured in position in the respective yokes and adapted to support a shaft 7 in position. The bearing 8 in the yoke 4 is pivotally mounted in position by means of set-screws 9 or other suitable means rigidly secured in the yoke and pivotally engaging the bearing 8 at approximately its center. The bearing 10 in the yoke 3 is arranged to move vertically and at the same time adjust itself to accommodate a shaft 10 the opposite end of which is positioned in the bearing 8. Any suitable means may be provided to control the position of the bearing 10. As shown a spring 12 is positioned between the bearings 5 and 10 adapted to hold the bearing 10 at the upper limit of its movement while a set-screw 14 or other convenient means is arranged in the yoke to limit the upward movement of the bearing and to adjust the same if desired. In the form shown the position of the bearing 10 is also controlled by a foot treadle or lever 16 pivotally attached to the frame 1 as at 17 and connected to the bearing by a forked rod 15 the forked end of which is attached to opposite sides of the bearing and extends downward to the treadle. When the treadle is depressed the bearing 10 is moved downward toward the bearing 5.

In the form shown my improved cutting mechanism is mounted upon the ends of the shafts 7 and 11, and comprises a pair of disks or rollers 18 and 19 rigidly attached to the shaft 7 beyond the housing 3. The adjacent faces of these disks are preferably flat, substantially parallel, and suitably spaced from each other to permit the cutter 20 upon the shaft 11 to enter the space between them and coöperate with the edges of the rollers to operate as a shear. Where my device is to be employed upon automobile tires the outer end of the roller 19 is rounded as shown in Figs. 1 and 4 to correspond in a measure with the usual form of the interior of an automobile tire. The cutter 20 is merely a circular disk suitably formed at its edges to coöperate with the rollers 18 and 19 and rigidly secured to the shaft 11 by collars 21 and 22 or other suitable means with a nut 23 or other convenient clamping means for forcing the collars together upon the disk. The collar 21 is preferably recessed adjacent the cutter 20 to afford sufficient space for the clencher of an automobile tire between the collar 21 and roller 18. The collar 22 however is substantially cylindrical its outer face being arranged to coöperate with the periphery of the roller 19 to engage the material being cut between them to feed the material to the cutter.

Any suitable means may be provided for rotating the shafts 7 and 11. As shown a pair of gears 25 and 26 are rigidly secured to the shafts 7 and 11 respectively of suitable size to rotatively connect the shaft 11 to the shaft 7. A gear 27 is also rigidly secured to the shaft 7 and extends through a suitable opening in the plate 2 and meshes with the gear 28 rigidly secured to a shaft 29 which is rotatably mounted in suitable bearings upon the frame 1. The shaft 29 is also provided with a gear 30 arranged to mesh with a gear 31 upon a shaft 32 also rotatably mounted upon the frame 1 and having a pair of tight and loose pulleys 33 and 34 or other suitable means adapted to receive a driving belt or other flexible means for transmitting power to the device.

In the preferred construction also suitable means are provided for partially supporting the material being operated upon. As shown, a pair of substantially horizontal rollers 36 and 37 are mounted in suitable brackets upon the frame in position to partially support the automobile tire or other material to be cut in the most convenient position. As shown, suitable means are also provided for guiding the material to the cutters, for this purpose an arm 38 is shown pivotally mounted upon the plate 2 as at 39, and provided with a suitable vertical roller 40 positioned to engage the edge of the tire to direct it to the cutters. Obviously if desired the arm 38 may be moved to any desired position and clamped against accidental displacement thus providing an accurate adjustable guide for the device.

In operation the tire is positioned upon the roller 19 as shown in Figs. 1-4 and 5 the foot-lever 16 is then depressed forcing the cutter 20 through the fabric, the edge of the cutter being preferably sharpened to facilitate this operation. As soon as a collar 22 engages the tire and presses it against the roller 19 with sufficient force the tire will be moved or fed along producing a smooth even cut. Obviously for cutting comparatively thin fabric or metal it is important to sharpen the cutter 20 so as to coöperate with the roller 19 to produce the best possible shearing cut. For thicker fabric however, while the shearing action is important to produce a satisfactorily clean cut the form of the knife may be considerably varied without serious objection.

Having thus described my improvement it is obvious that various immaterial modifications may be made in my device without departing from the spirit of my invention; hence I do not wish to be understood as limiting myself to the exact form or construction shown.

What I claim as new and desire to secure by Letters Patent is:

1. In a device of the kind described, a pair of cutting members adapted to coöperate as a shear and means for normally maintaining one of said members out of operative position, in combination with means at each of said members adapted to coöperate to feed the material to the cutters, and means for manually maintaining said first mentioned member and its feeding means in operative position.

2. In a device of the kind described, a pair of cutting members adapted to coöperate as a shear, means for normally maintaining one of said cutters out of operative position and mechanism for manually controlling the distance between said cutters, in combination with means upon said members adapted to coöperate to feed the material to the cutters, and means for directing said material during the cutting operation.

3. In a device of the kind described, a pair of cutting members adapted to coöperate as a shear, one of which is laterally movable, means for yieldingly holding said laterally movable cutter out of cutting position in combination with means at each cutter adapted to coöperate to feed the material to the cutters and mechanism for manually maintaining said laterally movable cutter and its feeding means in operative position.

4. In a device of the kind described, a pair of circular rotary cutting members adapted to coöperate as a shear, one of which is laterally movable, resilient means for normally maintaining said laterally movable member out of cutting position, in combination with means for manually controlling the distance between said cutters and means upon said members adapted to coöperate to feed the material to the cutters.

5. In a device of the kind described, a pair of circular rotary cutting members adapted to coöperate as a shear, one of which is laterally movable, means for normally maintaining said laterally movable member out of cutting position and means for manually controlling the distance between said cutters, in combination with means mounted concentrically with and rigidly attached to said members adapted to coöperate only when said cutters are in operative position to feed the material to the cutters.

In testimony whereof, I have hereunto signed my name in the presence of two subscribing witnesses.

HUGO REICHEL.

Witnesses:
BLANCHE CHALMERS,
BURTON U. HILLS.